United States Patent [19]
Tabei et al.

[11] 3,848,406
[45] Nov. 19, 1974

[54] GLASS FIBER ROVING BAND FOR FIBER REINFORCED PLASTICS

[75] Inventors: Kiyoshi Tabei, Fujisawa; Hirokazu Kittaka, Sagamihara, both of Japan

[73] Assignee: Nitto Boseki Co., Ltd., Gonome, Fukushima-shi, Japan

[22] Filed: Nov. 6, 1972

[21] Appl. No.: 303,838

[30] Foreign Application Priority Data
Nov. 18, 1971 Japan.............................. 46-107912

[52] U.S. Cl.................. 57/149, 57/140 G, 161/93, 161/176
[51] Int. Cl. ....... D02g 3/38, D02g 3/40, D02g 3/18
[58] Field of Search ......... 57/140 G, 144, 149, 147; 161/172, 175, 47, 93, 176

[56] References Cited
UNITED STATES PATENTS

| | | | |
|---|---|---|---|
| 559,080 | 4/1896 | Hughes | 57/149 X |
| 913,856 | 3/1909 | Sloper | 57/144 |
| 939,839 | 11/1909 | Himes | 57/149 |
| 1,563,307 | 11/1925 | Frank | 57/144 |
| 1,820,935 | 9/1931 | Buhler | 161/47 X |
| 2,217,826 | 10/1940 | Van Laer | 57/144 X |
| 2,321,512 | 6/1943 | Protz | 161/47 X |
| 2,379,881 | 7/1945 | Chamberlain | 57/149 X |
| 3,040,413 | 6/1962 | Marzocchi et al. | 57/140 G X |
| 3,243,949 | 4/1966 | Cliker et al. | 57/149 X |
| 3,273,978 | 9/1966 | Paul | 57/144 X |
| 3,756,910 | 9/1973 | Peters et al. | 161/175 X |
| 3,776,293 | 12/1973 | Marzocchi | 57/140 G X |

*Primary Examiner*—John W. Huckert
*Assistant Examiner*—Charles Gorenstein
*Attorney, Agent, or Firm*—Karl W. Flocks

[57] ABSTRACT

A glass fiber roving band for fiber reinforced plastics, which consists of plural glass fiber rovings arranged in side by side relation to form a substantially flat band and having glass fiber rovings or glass yarns spirally wound around the band to provide a transverse strength of the band.

1 Claim, 4 Drawing Figures

GLASS FIBER ROVING BAND FOR FIBER REINFORCED PLASTICS

The present invention relates to a glass fiber roving band which is adapted to be used as reinforcement for fiber reinforced plastics structures.

Generally, a glass fiber roving comprises a plurality of strands gathered together without twist. A plurality of such glass fiber rovings are usually placed in parallel relation with each other to form a band and dipped in a molten bath of thermosetting resins such as polyester or epoxy and thermoplastic resins such as polyvinylchloride or polypropylene to form a fiber reinforced plastics product having an increased tensile strength, impact strength and a high Young's modulus. If necessary, the dipped glass fiber rovings may be wound on a mandrel or the like to obtain a desired shape.

Usually, the glass fiber rovings are impregnated with the plastic material merely in a parallely gathered form, so that they provide a substantial strength in the longitudinal direction but are not effective to increase transverse strength.

Therefore, the present invention has an object to eliminate the above disadvantage of a conventional construction.

A further object of the present invention is to provide a glass fiber roving band for a fiber reinforced plastics which has an increased strength in the transverse direction as well as in the longitudinal direction.

According to the present invention, there is provided a glass fiber roving band for fiber reinforced plastics, said band comprising a plurality of glass fiber rovings and fibrous means wound around the glass fiber rovings to provide a transverse strength of the band. The fibrous means may be constituted by glass fibers, synthetic fibers, natural fibers or glass fiber rovings, and preferably wound spirally around the first mentioned glass fiber rovings.

The above and other objects and features of the present invention will become apparent from the following descriptions of preferred embodiments taking reference to the accompanying drawings, in which, FIG. 1 is a fragmentary plan view of one embodiment of the roving band in accordance with the present invention;

Figure 1:
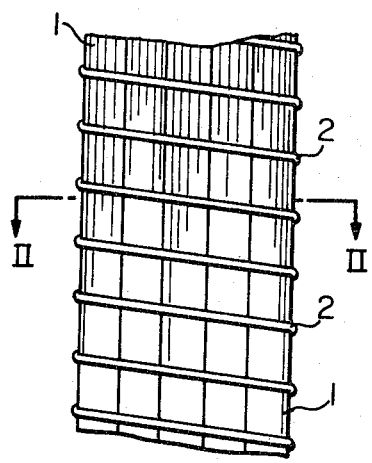
Figure 2:
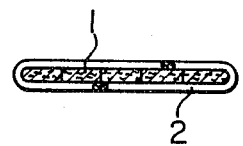
FIG. 2 is a sectional view taken along the line II — II of FIG. 1.

Referring now to the drawings, particularly to FIGS. 1 and 2, the reference numeral (1) designates glass fiber rovings each comprising a plurality such as several thousands of glass fiber strands which are simply gathered together without any twist. A plurality of such glass fiber rovings (1) are placed in side by side relation with each other to form a flat band and wound by a glass fiber yarn (2) comprising a plurality such as several hundreds of twisted glass fiber filaments. As shown in the drawings, the yarn (2) is spirally wound around the glass fiber rovings (1).

Figure 3:
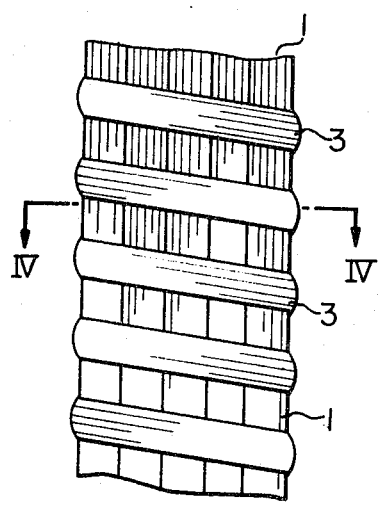
FIG. 3 is a fragmentary sectional view of another embodiment of the present invention.
Figure 4:
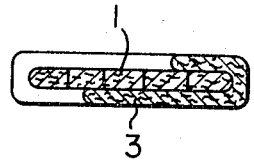
FIG. 4 is a sectional view taken along the line IV — IV in FIG. 3.

Referring now to FIGS. 3 and 4 which show another embodiment of the present invention, a plurality of glass fiber rovings (1) are placed in side by side relation with each other as in the previous embodiment and are bound by another glass fiber rovings (3) spirally wound therearound.

According to the present invention, the width of the band can be determined as desired by varying the number of the rovings (1). Further, the pitch of the yarn (2) or the roving (3) can be determined by controlling the feed speed of the rovings (1) as well as that of the yarn (2) or the roving (3).

According to a further aspect of the present invention, the glass fiber rovings (1) and (3) and the fiber yarn (2) may be treated by an organic chrome compound or an organic silicon compound in order to provide an affinitive nature with respect to plastic material in which the bundle is embedded.

It should be noted that in the glass fiber band in accordance with the present invention, the glass fiber rovings constituting the basic band are bound by a spirally wound fibrous means without being adhered thereto. Therefore, if there is any possibility that each of the roving is moved relative to the others or the fibrous means is moved with respect to the rovings, one or both of the rovings and the fibrous means may previously impregnated with a suitable synthetic resin in order to prevent such an undesirable result. It may be sufficient for the purpose to have resin impregnated only in the laterally outside rovings. Further, it may also be possible to have resin impregnated in the band after it is assembled.

The glass fiber roving band in accordance with the present invention can be manufactured with a less expensive cost as compared with a woven glass fiber fabric. The band can be used to provide a reinforced plastic having an increased longitudinal and transverse tensile strength by simply dipping the band in a molten bath of a plastic material and thereafter subjecting it to a de-foaming process. If desired, the band may be spirally wound around a mandrel to form a tube or pipe of a fiber reinforced plastics. The band of the present invention may be used with a plastic material of any form such as a molten plastic, an emulsion or a paste.

The invention has thus been shown and described with reference to preferred embodiments, however, it should be noted that the invention is in no way limited to the details of the illustrated embodiments but many changes and modifications can be made without departing from the scope of the appended claims.

We claim:

1. A flat glass fiber roving band for a fiber reinforced plastics, said band comprising a plurality of untwisted glass fiber rovings arranged in side-by-side relation with each other to provide said flat band, and fibrous means wound around the glass fiber rovings to provide a transverse strength of the band, only the transverse outside rovings being impregnated with synthetic resin before assembly.

* * * * *